United States Patent [19]
Nordquist

[11] Patent Number: 5,791,803
[45] Date of Patent: Aug. 11, 1998

[54] COMPRESSIVE HOLDING DEVICE

[75] Inventor: Bengt Hakan Nordquist, Taeby, Sweden

[73] Assignee: 3R International ab, Vallingby, Sweden

[21] Appl. No.: 571,793

[22] Filed: Dec. 13, 1995

[30] Foreign Application Priority Data

Dec. 13, 1994 [DE] Germany ............ 44 44 241.6

[51] Int. Cl.⁶ .................................................. F16B 2/00
[52] U.S. Cl. .......................... 403/13; 403/373; 403/375; 219/69.15
[58] Field of Search ............................ 403/13, 14, 337, 403/338, 354, 364, 373, 374, 375, 333, 334; 219/69.15

[56] References Cited

U.S. PATENT DOCUMENTS

| Re. 33,249 | 7/1990 | Schneider . | |
|---|---|---|---|
| 3,271,848 | 9/1966 | Montandon . | |
| 3,354,750 | 11/1967 | Gleasman . | |
| 3,390,974 | 7/1968 | Parsons et al. | 423/375 X |
| 3,711,105 | 1/1973 | Johanson | 219/69.15 X |
| 4,074,946 | 2/1978 | Swearingen | 403/364 |
| 4,449,027 | 5/1984 | Fujikawa . | |
| 4,838,553 | 6/1989 | Büchler . | |
| 4,855,558 | 8/1989 | Ramsbro . | |
| 5,167,464 | 12/1992 | Voellmer | 403/13 |
| 5,253,944 | 10/1993 | Preston | 403/13 |

FOREIGN PATENT DOCUMENTS

| 0267352 | 2/1987 | European Pat. Off. . | |
|---|---|---|---|
| 108675 | 4/1899 | Germany . | |
| 288235 | 1/1912 | Germany . | |
| 285975 | 7/1914 | Germany . | |
| 1477140 | 7/1963 | Germany . | |
| 2646951 | 4/1978 | Germany . | |
| 2725655 | 12/1978 | Germany . | |
| 3003756 | 8/1980 | Germany . | |
| 9203992.8 | 5/1992 | Germany . | |
| 4116103 | 11/1992 | Germany | 219/69.15 |
| 76218 | 4/1986 | Japan | 219/69.15 |

*Primary Examiner*—Harry C. Kim
*Attorney, Agent, or Firm*—Jacobson, Price, Holman & Stern, PLLC

[57] ABSTRACT

A compressive holding device having two coupling pieces and forcible elements for reversibly, axially, and compressively engaging the two coupling pieces in mutual engagement, wherein one of the coupling pieces has a plurality of aligning elements and the other coupling piece has a plurality of cooperating elements, such that when the compressive interengagement is carried out, the aligning elements and cooperating elements cooperate in mutual abutment to achieve accurate positioning of the coupling pieces in a circumferential direction. The aligning elements and/or the cooperating elements are subjected to a force in the circumferential direction, such that the cooperating elements and aligning elements are brought into forcible mutual abutment. The coupling pieces respectively have cooperating reference surfaces extending transversely to the direction of compressive interengagement, which reference surfaces facilitate accurate axial positioning.

29 Claims, 3 Drawing Sheets

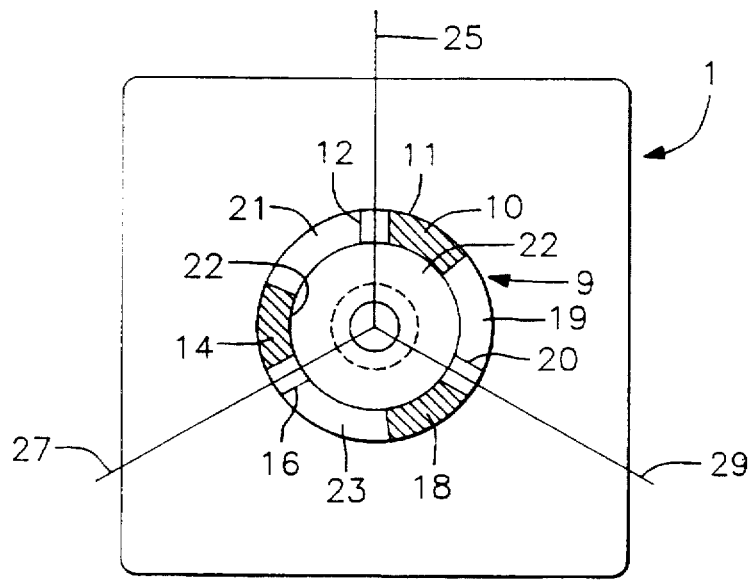
FIG. 3
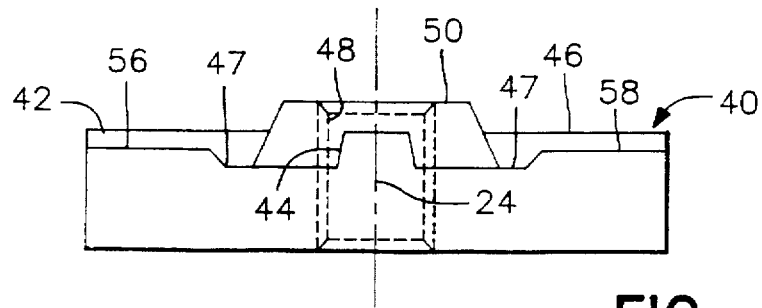
FIG. 4
FIG. 5
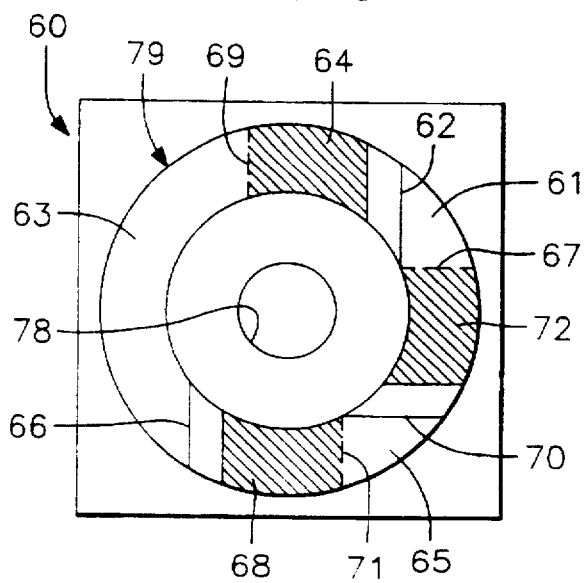
FIG. 6

2

1
COMPRESSIVE HOLDING DEVICE

BACKGROUND OF THE INVENTION

1. Field of the Invention

The invention relates to a device for compressive engagement, comprised of two coupling pieces and forcible means for reversibly axially compressively engaging the two coupling pieces in mutual engagement, wherein one of the coupling pieces has a plurality of aligning elements and the other coupling piece has a plurality of cooperating elements, wherein when the axially compressive interengagement is carried out the said aligning elements and cooperating elements cooperate in mutual abutment to achieve accurate positioning of the coupling pieces in the circumferential direction.

2. Description of Related Art

A known arrangement, disclosed in Ger. OS 30 03 756, is useful for holding electrodes for electromilling machines, wherein the coupling piece equipped with the aligning elements is fixed to the machine. The aligning elements comprise three axially projecting conical pins, wherein when the two coupling pieces are pressed together the said pins engage conical depressions in the opposite coupling piece, as cooperating elements with said pins. The combination of alignment of the movable coupling piece to the fixed coupling piece in the z-direction (being the direction of the pressing of the two pieces together) and alignment in the plane normal to the z-direction (viz., alignment in the circumferential direction) achieved by the known device has the disadvantage that a compromise of the accuracy of alignment in one direction has a detrimental effect on alignment in the other, e.g. loss in the accuracy of alignment in the said normal plane due to dimensional deviations in the coupling pieces or due to wear after long service will be accompanied by a loss of accuracy of alignment in the z-direction.

Eur. OS 111,092 (U.S. reissue Pat. No. RE 33,249) discloses a device for compressive engagement wherein an axially elastic catch plate is interposed between the two coupling pieces. The catch plate is attached with a gap to one of the coupling pieces, which piece is either a workpiece or a workpiece holder. The other coupling piece is an integral component of the working head of a machine tool, usually an electromilling machine, and has ridges which engage recesses in the catch plate when the assembly comprising the two coupling pieces and the catch plate is brought into compressive engagement. The workpiece is subjected to forming outside the machine tool, such that after mounting on the machine tool it can serve as a tool, e.g. an electrode for electromilling.

With such an arrangement the problem occurs that cuttings, fines, or other debris from the machining can accumulate between the catch plate and the associated coupling piece, resulting in detrimental loss of the free elastic resilience of the catch plate in the compressive engagement of the two coupling pieces.

Eur. Pat. 255,042 (U.S. Pat. No. 4,855,558) discloses a device for compressive engagement wherein the coupling piece provided with ridges is also integrated into the head of the machine tool (principally an electromilling machine). Axially elastic elements in the form of pairs of lip members are provided on the other coupling piece (which piece serves as the workpiece support), wherein when the workpiece holder is compressively engaged with the machine tool head the ridges penetrate between the edges of respective pairs of lip members. Even though between successive compressive mountings the workpiece undergoes appreciable mechanical machining, the requirement is imposed that each re-mounting achieves a high degree of angular accuracy. With the arrangement according to Eur. Pat. 255,042, this necessitates high fabrication costs for the machining to produce the lip members. However, a large number of workpiece holders is required because a large number of electrodes are needed for the electromilling of a single workpiece.

SUMMARY OF THE INVENTION

Accordingly, the underlying problem of the present invention is to devise a device for compressive engagement, of the general type described supra, wherein the coupling piece serving as an electrode support or workpiece support can be fabricated at substantially lower cost.

This problem is solved according to the invention in that in the course of the compressive interengagement the aligning elements and/or the cooperating elements are subjected to a force in the circumferential direction, such that the cooperating elements and aligning elements are brought into forcible mutual abutment and in that the coupling pieces respectively have cooperating reference surfaces extending transversely to the direction of compressive interengagement, which reference surfaces facilitate accurate axial positioning. With this arrangement, the coupling piece bearing the cooperating elements is much easier to fabricate. Further, the problem of high sensitivity to soiling is avoided, because the coupling piece intended to be used as a workpiece holder or the like does not have any complex recesses susceptible to detrimental accumulation of cuttings, fines, or other debris from the machining of the workpiece.

In a preferred embodiment (or refinement) of the invention, a weakly curved convex spherical surface may be provided on the aligning surface of each aligning element which surface neighbors or abuts, the associated cooperating element or, alternatively, such weakly curved spherical surface may be on the cooperating surface of each cooperating element which surface neighbors or abuts the associated aligning element. This ensures that the forcible abutment of the cooperating element against the aligning element in the circumferential direction which is accomplished on the occasion of the compressive interengagement of the two coupling pieces will have essentially a point locus, thereby further reducing susceptibility of the alignment to inaccuracies due to soiling, particulate matter, and the like.

In a particularly simple embodiment of the invention, at least one pressing element is formed on the coupling piece which bears the aligning elements, which pressing element forcibly engages the other coupling piece when the compressive interengagement of the two coupling pieces is carried out.

In another preferred embodiment (or refinement) of the invention, advantageously elastic pressing elements are provided, wherein on the occasion of the compressive interengagement of the two coupling pieces, each cooperating element is essentially forced against an aligning element by such a pressing element. The pressing elements, which advantageously are provided on the coupling piece which is intended to be fixed to the machine, do not themselves perform an aligning function but serve to press the cooperating elements against the aligning elements and facilitate the release of the interengagement of the coupling pieces after the forcible means of compressive interengagement are relaxed.

Other particularly advantageous embodiments are possible according to the invention. For example, the cooperating elements may be in the form of axially projecting ridges which extend from the periphery of a coupling piece inward, advantageously along a radius, wherein advantageously each such ridge has at least one wedge surface or truncated wedge surface. As a means of facilitating interpenetration during the engagement of the movable coupling piece against the coupling piece fixed to the machine, the movable coupling piece may bear a central prominence having a generally frustoconical shape which can be inserted in a central recess in the coupling piece which is fixed to the machine.

It is recommended that the aligning elements be in the form of free, rigid edges extending inward from the periphery. It is further advantageous if an axially elastic lip member is provided at a short separation in the circumferential direction from each aligning element, wherein said lip members are configured and disposed such that during the compressive interengagement of the coupling pieces a respective cooperating element penetrates into a groove which is left between each lip member and the neighboring aligning element. Finally, it is advantageous if each cooperating element has two opposite parallel wedge surfaces or truncated wedge surfaces i.e. two inclined surfaces having parallel longitudinal axes, and if the edges of each aligning element and its neighboring lip(s) are parallel. Advantageously, the reference surfaces are formed on raised structures which extend axially above at least one of the coupling pieces by a height which is less than that of the ridges. For small tools (or electrodes) which are connected to the movable coupling piece, according to a refinement of the invention it is sufficient if three aligning elements are provided on the coupling piece which is intended to be attached to the machine tool, wherein these aligning elements are equidistantly disposed in the circumferential direction. The reference surfaces may be disposed in the circumferential direction between pairs of successive aligning elements, and also between pairs of successive cooperating elements. If the coupling pieces have round outer contours, the lip members may also be arcuate. Advantageously the lip members and aligning elements are in a common plane.

The coupling piece can be particularly easily adapted to workpiece dimensions which are relatively small compared to the dimensions of the coupling means provided on the machine tool, if, according to a refinement of the invention, the coupling piece intended to be fixed to the machine tool is provided with axially elastic elements on its side which is opposite to the aligning elements, wherein when said coupling piece is releasably fixed to the machine tool head said elastic elements cooperate with ridges provided on said machine tool head. This allows a substantially smaller radial dimension of said coupling piece on its side bearing the aligning elements than on its side bearing the said elastic elements.

The invention will be described in more detail hereinbelow, with reference to exemplary embodiments illustrated in the accompanying drawings.

BRIEF DESCRIPTION OF THE DRAWINGS

FIG. 3 is a bottom view of the first coupling piece according to FIG. 1;

FIG. 4 is a lateral view of the second coupling piece according to FIG. 2;

FIG. 5 is a bottom view of a second inventive embodiment of the first coupling piece;

FIG. 6 is a top view of a second inventive embodiment of the second coupling piece;

DESCRIPTION OF THE PREFERRED EMBODIMENTS

Figure 1:
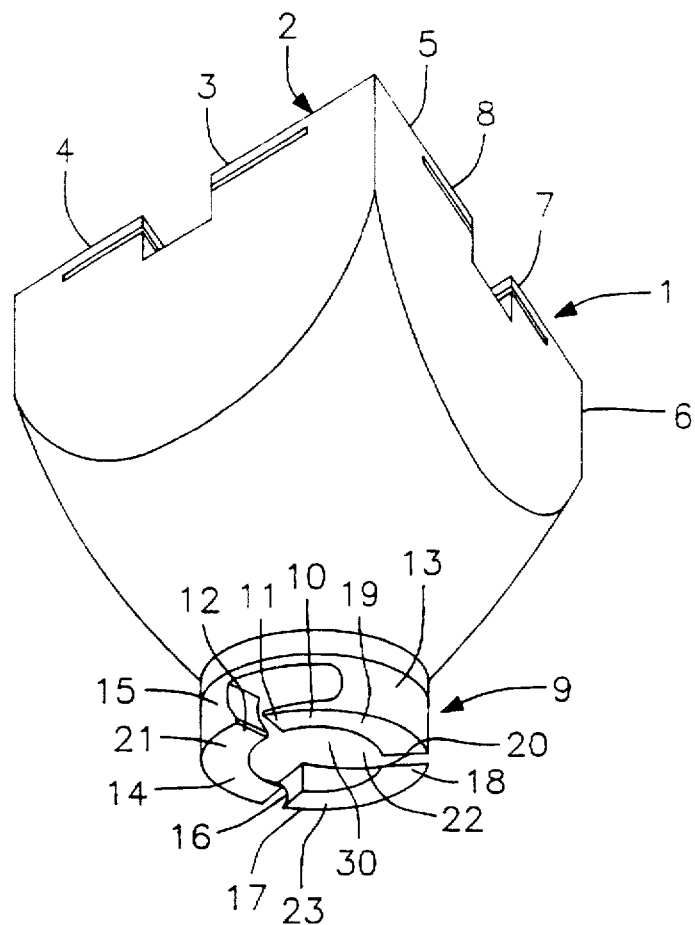
FIG. 1 is a schematic perspective view of a first coupling piece, which is connectable to a machine tool.
Figure 2:
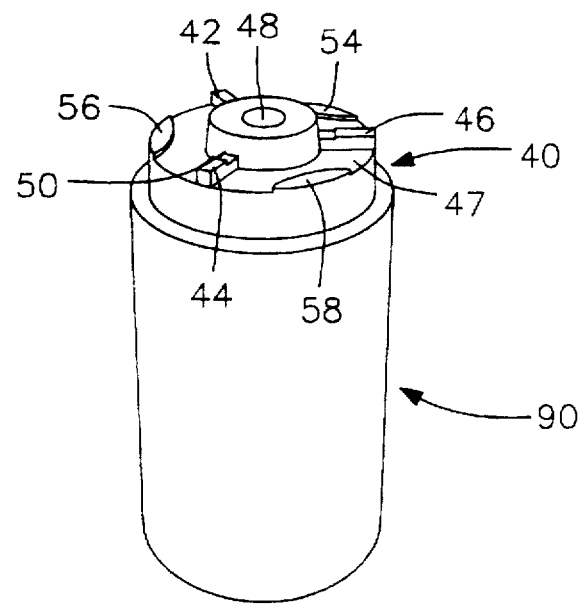
FIG. 2 is a schematic perspective view of a second coupling piece which is essentially axially aligned with the piece of FIG. 1 and is connectable to an electrode element for electromachining.

The coupling support designated generally 1 in FIG. 1 is adapted to be releasably fixed to the head of an electromilling or electromachining machine, such as an electrical discharge machine (EDM) (not shown), by screw or clamp means. For this purpose, the free end face of the machine head bears posts and ridges or the like, e.g. such as described in Eur. Pat. 255,042 (U.S. Pat. No. 4,855,558). In this connection (as described in said Eur. Pat.), the upper side 2 of coupling support 1 is provided with four pairs of lip members (3, 4; 7, 8) disposed in a cross arrangement, which lip members engage the corresponding ridges disposed in a cross arrangement on the machine head when said coupling support 1 is mounted on the machine head; wherein, during the mounting of support 1 the said ridges on the machine head engage support 1 and aid in the positioning of support 1. The regions between the lip pairs on the upper side of the coupling support 1, e.g. region 5, serve as reference surfaces for the positioning of the coupling support 1 in the z-direction (which direction coincides with the major axis of coupling support 1).

The coupling support 1 has a square cross section in its upper region 6 in the plan view, and has an adjoining lower region which narrows conically to a first coupling piece 9 which has an essentially cylindrical outer periphery. Thus the diameter of piece 9 is substantially less than the length of a side of the support 1 in its upper region 6.

Three lip members (10, 14, 18) are formed on the first coupling piece 9; each of these has a circular arcuate shape as it adjoins the lateral periphery of the coupling piece 9. By virtue of deep undercutting, the lip members (10, 14, 18) are axially elastic, have a free surface on a common end face of piece 9, and are bounded radially inwardly by a deep central circular recess 22 extending axially upward (FIG. 1) from said end face. The end of each lip member (10, 14, 18) is radially parallel, e.g. designated 11 for member 10.

Three solid structures (13, 15, 17) remain on the first coupling piece 9; these terminate axially in the common plane of the lip members (10, 14, 18). Each structure (13, 15, 17) is bounded in one angular direction (counterclockwise in FIG. 1) by the respective lip member (10, 14, 18), and in the opposite angular direction by a free rigid edge (20, 12, 16) which here comprises a radially parallel edge surface which serves as an abutting or aligning element for a ridge on the second coupling piece 40. Thus a flat surface region (19, 21, 23) is provided between the lip member (10, 14, 18) and the rigid edge (20, 12, 16) on the solid structure (13, 15, 17), which flat region serves as a reference surface for the z-direction when the first coupling piece 9 is compressively engaged with a second coupling piece 40.

A slot is present between each lip member (10, 14, 18) and the neighboring rigid edge (12, 16, 20), for accommodating an opposing ridge element (described below) on the second coupling piece 40 during the engagement process. These slots all have the same gap. In FIG. 3 the center lines of the slots are designated 25, 27, and 29, respectively, and the lip members are indicated with diagonal hatching. In the inventive embodiment shown, the center lines (25, 27, 29) extend along radii at 120° intervals.

It is possible for the mutual separations of the slots in the circumferential direction to be unequal, within the scope of the invention, wherein, e.g., the circumferential angle between middle lines 25 and 27, and between middle lines 25 and 29, is 115°, and that between middle lines 27 and 29 is 130°.

The second coupling piece 40 is fixed to the center of the top end surface of an electrode element 90 for electromachining. Three ridges (42, 44, 46) equidistant in the circumferential direction project axially from the top side 47 of second coupling piece 40. Each such ridge extends radially outward from a central axially projecting ring 50 which surrounds a central bore 48, and each such ridge has two opposite radially parallel wedge surfaces or truncated wedge surfaces. At its upper face, each ridge (42, 44, 46) is narrower than the corresponding slot between a lip member (10, 14, 18) and the neighboring rigid edge (12, 16, 20) on the first coupling piece 9; and at its base (at the transition to the body of the second coupling piece 40), each ridge is wider than said corresponding slot. All of the slots have the same width, and the profiles of all of the ridges (42, 44, 46) are mutually the same. The pair of inclined surfaces (truncated wedge surfaces) on each ridge (42, 44, 46) is configured such that when the coupling pieces 9 and 40 are compressively interengaged each said pair of inclined surfaces can penetrate into the aforesaid respective slot on the first coupling piece between the free end of a lip and the neighboring rigid edge. Reference surfaces (54, 56, 58) are formed between respective pairs of ridges on the periphery of the second coupling piece 40, which surfaces are perpendicular to the axis 24 and extend an axial distance above the upper side 47 which distance is less than the height of the ridges (42, 44, 46). These reference surfaces are intended to abut against the corresponding reference surfaces (19, 21, 23) on the first coupling piece when the pieces are compressively interengaged, thereby providing alignment in the z-direction.

Of course, the angular separation of the ridges (42, 44, 46) in the circumferential direction matches that of the aforesaid middle lines (25, 27, 29).

To engage the second coupling piece 40, with or without an electrode element 90, against the first coupling piece 9, a tensile bolt (not shown) is extended through the central bore 30 of the coupling support 1 and is screwed into, e.g., an inner thread provided in bore 48. The part of the bolt extending upward from the coupling support 1 is engaged in a tensioning device disposed in the machine head, which device is described in Eur. Pat. 255,042, whereby means such as compressed air are employed to raise the bolt axially, forcibly causing the coupling support 1 to abut against the machine head and the second coupling piece 40 to abut against the first coupling piece 9, wherein the ridges (42, 44, 46) penetrate into the slots, wherein one inclined surface (truncated wedge surface) of each ridge is forcibly engaged against the corresponding rigid edge (12, 16, 20). The engagement of said inclined surface against said edge is aided by forces exerted by the lip members (10, 14, 18) which urge such engagement. The ridges (42, 44, 46) penetrate into the slots until the reference counter-surfaces (54, 56, 58) abut against the corresponding reference surfaces (19, 21, 23) on the first coupling piece 9. As a result the second coupling piece 40 is accurately positioned in the z-direction (which is the direction of the compressive engagement) and in the circumferential direction, the latter positioning being achieved by the forcible abutment of one of the inclined surfaces of each ridge against the corresponding rigid edge (12, 16, 20) under the compressive engaging force of the neighboring lip member.

The central ring 50, which projects higher over the top side 47 than do the ridges, helps to guide said ridges into the slots. In this connection, the ring 50 also has a truncated wedge profile. The outer diameter of the ring 50 is such that the ring can penetrate into the recess 22 without resistance.

To release the engagement of the second coupling piece 40 with the first coupling piece 9, piece 9 can be lowered in the direction opposite to the engagement direction, by relaxing the operative air pressure in the tensioning device. The release of piece 40 is facilitated by the relaxation of the lip members (10, 14, 18).

Figure 9:
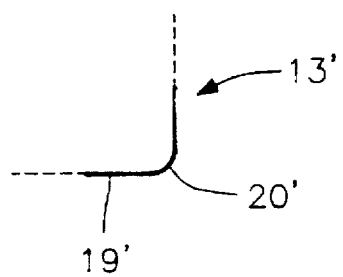
FIG. 9 is a close-up view of a rigid edge of a first coupling piece having a gently curved spherical surface.
Figure 10:
FIG. 10 is a close-up view of a rigid edge of a ridge of a second coupling piece having a gently curved spherical surface.

The rigid edges (20, 12, 16) which form the abutting or aligning surfaces may be weakly or gently curved (i.e. having a large radius of curvature) convex spherical surfaces such as surface 20' as shown in FIG. 9. Alternatively, the ridges (42, 44, 46) may have their surfaces that engage the rigid edges (20, 12, 16) also of a weakly curved spherical surface such as the ridge 44' shown in FIG. 10. This ensures that the abutment between the alignment element and ridges of the cooperating element will essentially be along a point or line.

In the second embodiment of a coupling support (60), illustrated in FIG. 5, similar to the above-described exemplary embodiment, rigid edges (62, 66, 70) are formed on the free lower end face of the first coupling piece 79, but here the rigid edges each extend parallel to a secant of the circle describing the periphery of coupling piece 79 and are essentially perpendicular to each other. A ring-shaped surface is formed which is interrupted by the three slots associated with said rigid edges. Each such rigid edge (62, 66, 70) has immediately neighboring it an axially elastic lip member (64, 68, 72) formed by undercutting material in the region 69 (and 71 and 67) of the coupling piece 79. Fixed axial reference surfaces (61, 63, 65) remain on the ring-shaped surface, each such reference surface extending between the neighboring rigid edge (62, 66, 70) and the beginning of the respective lip (72, 64, 68) (said beginning indicated by respective dotted lines (67, 69, 71)). The reference surfaces (61, 63, 65) are in a common plane which is perpendicular to the axis of the coupling support 60.

The second coupling piece 80 (FIG. 6) associated with first coupling piece 79 is here fixed to the end face of a cylindrical electrode element 91 for electromachining. Piece 80 has reference counter-surfaces (81, 83, 85) which come to abut against the corresponding reference surfaces (61, 63, 65) on the first coupling piece 79 when the two coupling pieces (79, 80) are compressively interengaged. As in the above-described embodiment, the reference counter-surfaces (81, 83, 85) are formed on structures which rise above the upper side 87 of the second coupling piece 80.

Three ridges (82, 84, 86) project from the upper side 87; these ridges have inclined lateral surfaces (truncated wedge surfaces) (not illustrated). The ridges are each parallel to a secant of the circular perimeter of the second coupling piece 80, and are mutually perpendicularly directed, and each such ridge extends inward from the circular periphery of said piece 80. When piece 80 is engaged with the first coupling piece 79, each of the ridges (82, 84, 86) engages into the unique slot corresponding thereto, between a rigid edge (62, 66, 70) and a neighboring or adjacent lip member (64, 68, 72).

It is seen from FIGS. 5 and 6 that the slots and strips respectively have nonuniform angular separation in the circumferential direction. Accordingly, there is only a single mutual orientation in which the two coupling pieces (79, 80) can be interengaged.

Three countersunk bores (92, 94, 96) are provided in the upper side 87 of the second coupling piece 80, near the reference counter-surfaces (81, 83, 85) and the ridges (82, 84, 86), for accommodating threaded bolts which may be used to attach the electrode element 91.

Finally, the second coupling piece 80 has a central threaded bore 89 in which the external thread of a tensile anchor for the tensioning device can be engaged, which anchor will extend through the central bore 78 in the first coupling piece 79 and the coupling support 60.

As in the embodiment of FIGS. 1–4, the rigid edges (62, 66, 70) which form the aligning surfaces or, alternatively, the surface of the ridges (82, 84, 86) of the cooperating elements may be gently curved spherical surfaces.

Figure 7:
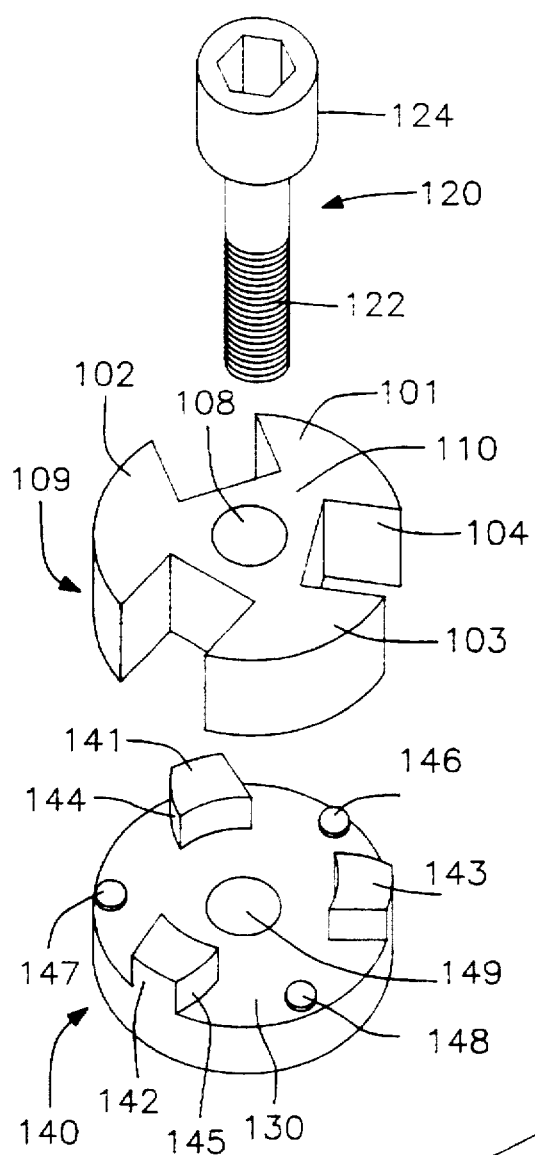
FIG. 7 is a perspective view of a third inventive embodiment, comprising a pair of coupling pieces which can be compressionally interengaged by means of a bolt.
Figure 8:
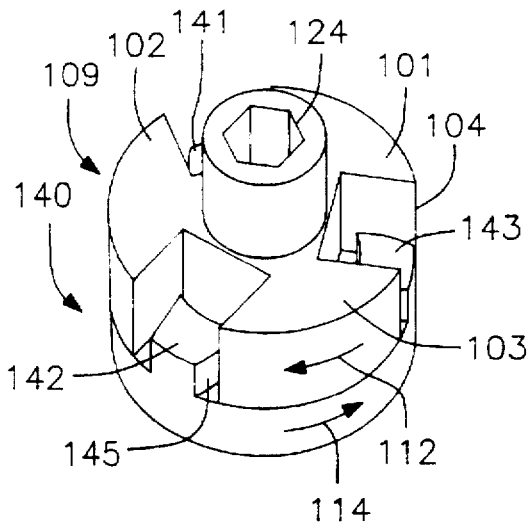
FIG. 8 illustrates the embodiment according to FIG. 7 during a time when the coupling pieces are in the process of becoming compressionally interengaged.

The inventive embodiment according to FIGS. 7 and 8 provides a particularly clear demonstration of the inventive principle employed for exact positioning of the second coupling piece 140 with respect to the first coupling piece 109, in both the axial direction (z-direction) and the circumferential direction (or in general the x-y plane, which is normal to the z-direction). The relative orientation achieved is very precise and has very highly repeatable accuracy—in several hundred cycles of compressive interengagement and release of the two coupling pieces the deviations in relative position will be on the order of a few microns.

As in the exemplary embodiments described above, the first coupling piece 109 can be fixed at its top side 110 to the bottom side of a coupling support of a machine head (not shown in FIGS. 7 and 8), and the second coupling piece 140 can be connected at its bottom side to an electrode element (not shown in FIGS. 7 and 8).

The first coupling piece 109 has an essentially cylindrical shape, and has three notches which extend radially inward from its lateral surface. Three aligning members (101, 102, 103) are thereby defined which are bounded in the circumferential direction by the respective pairs of such notches. Each aligning member (101, 102, 103) has one respective aligning surface, of which only one such, 104, is visible. In a plan view of the first coupling piece 109 the aligning surface in each instance is the leading surface of the aligning member if the piece 109 is in clockwise rotation. All of the said aligning surfaces are parallel to the center axis of first coupling piece 109. The notches are equidistant in the circumferential direction, have the same symmetrical right-angled shape in the plan view, and each is disposed symmetrically with respect to the center axis of the first coupling piece 109; accordingly, the aligning surfaces are also mutually equidistant in the circumferential direction and are equidistant from the center axis. Each is intended to serve as a reference surface in aligning the second coupling piece 140 with respect to the first coupling piece 109, in the circumferential direction.

In the embodiment illustrated, the second coupling piece 140 is essentially cylindrical, with the same diameter as the first coupling piece 109. Three cooperating elements (141, 142, 143) rise as prominences above the top side 130 of the second coupling piece 140; these are equidistant in the circumferential direction, have the same shape, and have a width in the circumferential direction which is less than that of a notch in the first coupling piece 109. Their height above the top side 130 is less than the axial thickness of the first coupling piece 109. The leading face of each cooperating element (141, 142, 143) in a counterclockwise rotary motion thereof considered in the plan view is the face which will engage the aligning faces (104 etc.) of the first coupling piece 109; two such cooperating faces, 144 and 145, on elements 141 and 142, respectively, are visible in FIG. 7. As seen from FIG. 7, these cooperating faces are convexly curved, in particular spherically convexly curved, to a slight degree. It is intended that when the coupling pieces 109 and 140 are compressively interengaged and urged in rotation in opposite directions around a common axis (FIG. 8), said cooperating faces will come to abut against the aligning faces (104 etc.) of the aligning members (101, 102, 103).

Three raised nubs (146, 147, 148), here cylindrical, are provided, equidistantly in the circumferential direction, on the top side 130 of the second coupling piece 140. Each of these nubs is disposed between a respective pair of the aforementioned cooperating elements (141, 142, 143). The end faces of the nubs (146, 147, 148) serve as reference surfaces and are accurately perpendicular to the center axis of the second coupling piece 140. The height of each nub (146, 147, 148) above the top side 130 is substantially less than the height of the said cooperating elements.

The bottom side (not shown) of the first coupling piece 109 also serves as a reference surface, oriented accurately perpendicular to the center axis of coupling piece 109.

Various means may be employed to compressively interengage the two coupling pieces (109, 142). Said interengaging means must be suitable to bring the pieces (109, 142) to forcibly abut against each other in the axial direction such that the z-direction reference surface of the first coupling piece 109, namely the bottom side of piece 109, comes to abut the z-direction reference surfaces of the second coupling piece 140, namely the surfaces of the nubs (146, 147, 148); further, said means must be suitable to rotate the first coupling piece 109 clockwise (arrow 112 in FIG. 8) with respect to the second coupling piece 140, and/or to rotate the second coupling piece 140 counterclockwise (arrow 114 in FIG. 8) with respect to the first coupling piece 109. This rotation brings about the forcible abutment of the cooperating faces of the cooperating elements (141, 142, 143) against the aligning faces of the aligning members (101, 102, 103).

The interengaging means may comprise, e.g., a tensile bolt of the type described in Eur. Pat. 255,042, having a foot anchorable in a central blind hole 149 in the second coupling piece 140, wherein the tensile bolt extends through the central bore 108 in the first coupling piece 109 and into a receiving means in the machine tool head, which receiving means engages the head of the bolt and urges it upward in the z-direction, thereby pulling the second coupling piece 140 upward (along with an electrode or other implement attached to piece 140) in the z-direction against the first coupling piece 109 until the z-direction reference surfaces come to mutually abut. A thrusting element, e.g. a plunger driven by pressurized air, may be provided in the machine tool head, which element acts on an axially parallel, radially displaced shoulder (not shown) on the tensile bolt and rotates said bolt in the direction of arrow 114 with respect to the first coupling piece 109, until the cooperating surfaces (144, 145, etc.) of the second coupling piece 140 are brought to abut against the aligning surfaces (104, etc.) of piece 109. When the pressurized air acting on the holding means for the tensile bolt and on the torque-exerting thrusting element is relaxed, the second coupling piece 140 can be readily separated from the first coupling piece 109 and thereby can be removed from the machine tool.

Another, simpler and more customary means of compressive engagement employs the threaded bolt 120 illustrated in FIGS. 7 and 8. The bolt shaft 122 extends through the bore 108 and its threaded region engages an inner thread in bore 149. The bolt head 124 lies on the top side 103 of the first coupling piece 109. The two coupling pieces (109, 140) are compressively engaged in the axial direction by screwing the bolt 120 into the opening 149, wherein rotation of the bolt head 124 tends to cause the first coupling piece 109 to rotate along with it in the direction of arrow 112, until eventually the reference surfaces for the circumferential alignment and the reference surfaces for positioning in the z-direction all come into respective forcible abutment.

I claim:

1. A compressive holding device comprising two coupling pieces and means for reversibly, axially, and compressively engaging the two coupling pieces in mutual engagement, wherein one coupling piece has a plurality of aligning elements and the other coupling piece has a plurality of cooperating elements such that when the coupling pieces are compressively interengaged, said aligning elements and cooperating elements cooperate to achieve accurate positioning of the coupling pieces in the circumferential direction by subjecting at least one of said plurality of aligning elements and said plurality of cooperating elements to elastic forces in circumferential direction such that the cooperating elements and aligning elements are brought into forcible mutual abutment to form a positive circumferential stop without deformation of either of said cooperating elements and aligning elements, and wherein each of said coupling pieces have cooperating reference surfaces extending transversely to the axial direction of compressive interengagement to allow accurate axial positioning.

2. A device according to claim 1 wherein each of said plurality of aligning elements includes an aligning surface, said aligning surface abuttingly engaging the associated cooperating element.

3. A device according to claim 2 wherein said aligning surface is a gently curved spherical surface.

4. A device according to claim 1 wherein each of said plurality of cooperating elements includes a gently curved spherical surface defining a cooperating surface, said cooperating surface abuttingly engaging the associated aligning element.

5. A device according to claim 1 wherein said one coupling piece further comprises at least one pressing element for forcibly engaging said other coupling piece.

6. A device according to claim 5 wherein said one coupling piece further comprises a plurality of pressing elements for forcing each said cooperating element against a respective aligning element.

7. A device according to claim 6 wherein each said pressing element is elastic.

8. A device according to claim 1 wherein each of said aligning elements include free, rigid edges.

9. A device according to claim 1 wherein said one coupling piece further comprises a plurality of axially elastic lip members, each located at a separation in the circumferential direction from each of said aligning elements, wherein during the compressive interengagement of the coupling pieces, each of said respective cooperating element penetrates into the separation between each of said lip members and the adjacent aligning elements.

10. A device according to claim 9 wherein each of said cooperating elements has two opposed parallel wedge surfaces which are parallel to a radius of said other coupling piece, and each of said aligning elements and its adjacent lip member have respective edges which are mutually parallel and parallel to a radius.

11. A device according to claim 9 wherein each of said lip members have an arcuate shape.

12. A device according to claim 9 wherein each of said lip members and the aligning elements lie in a common plane.

13. A device according to claim 1 wherein said one coupling piece includes means for affixing to a machine head.

14. A device according to claim 1 wherein said aligning elements and cooperating elements are equidistantly disposed in a circumferential direction.

15. A device according to claim 1 wherein said reference surfaces on said one coupling piece are disposed between successive aligning elements, and said reference surfaces on said other coupling piece are disposed between successive cooperating elements.

16. A device according to claim 1 wherein said one coupling piece has three aligning elements, and said other coupling piece has three cooperating elements.

17. A device according to claim 1 wherein said other coupling piece has a central ring-shaped structure of frustoconical cross section, and said one coupling piece has a corresponding central recess.

18. A device according to claim 1 wherein said one coupling piece includes means for connecting with a machine head, said means for connecting including axially elastic elements for releasably cooperating with ridges provided on said machine head.

19. A device according to claim 18 wherein said one coupling piece has a substantially smaller radial dimension on its side bearing the aligning elements than on its side connectable to the machine head.

20. A compressive holding device comprising two coupling pieces and means for reversibly, axially, and compressively engaging the two coupling pieces in mutual engagement, wherein one coupling piece has a plurality of aligning elements and a plurality of elastic pressing elements and the other coupling piece has a plurality of cooperating elements such that when the coupling pieces are compressively interengaged, said aligning elements, elastic pressing elements, and cooperating elements cooperate to achieve accurate positioning of the coupling pieces in the circumferential direction by subjecting the aligning elements and said cooperating elements to relative circumferential forces in opposite circumferential directions such that said elastic pressing elements force said cooperating elements against respective aligning elements wherein said cooperating elements and aligning elements are brought into forcible mutual abutment, and wherein each said cooperating element includes an axially projecting ridge extending inwardly from the periphery of said other coupling piece, each said ridge having at least one inclined surface, and wherein each of said coupling pieces have cooperating reference surfaces extending transversely to the axial direction of compressive interengagement to facilitate accurate axial positioning.

21. A device according to claim 20 wherein each said ridge extends radially.

22. A device according to claim 20 wherein the reference surfaces of said other coupling piece are formed on raised structures which extend axially at a height which is less than the height of said ridges.

23. A compressive holding device comprising two reversibly, axially, and compressively engageable coupling pieces, wherein one coupling piece has a plurality of aligning elements having rigid edges and a corresponding plurality of elastic pressing elements wherein each of said rigid edges is spaced apart from a corresponding elastic pressing element, and the other coupling piece has a plurality of cooperating elements each having an axially projecting ridge, such that when the coupling pieces are axially and compressively interengaged, each said axially projecting ridge of said other coupling piece fits between a rigid edge and a corresponding pressing element of said one coupling piece, whereby said pressing element forces said ridge against said rigid edge in a direction substantially transverse to the axial direction such that the cooperating elements and aligning elements are brought into forcible mutual abutment, and wherein each of said coupling pieces have cooperating reference surfaces extending transversely to the axial direction of compressive interengagement to facilitate accurate axial positioning.

24. A device according to claim 23 wherein each said axially projecting ridge extends inwardly from the periphery of said other coupling piece, each such ridge having at least one inclined surface.

25. A device according to claim 24 wherein each said axially projecting ridge extends radially.

26. A device according to claim 23 wherein each of said elastic pressing elements includes an axially elastic lip member located at a separation in the circumferential direction from each rigid edge, wherein during the compressive interengagement of the coupling pieces, a respective ridge penetrates into the separation between each elastic lip member and the adjacent rigid edge.

27. A device according to claim 26 wherein each ridge includes two opposed parallel wedge surfaces which are parallel to a radius of said other coupling piece, and each lip member has a lip member edge, whereby said lip member edge and said cooperating rigid edge are substantially parallel.

28. A compressive holding device comprising two coupling pieces and means for reversibly, axially, and compressively engaging the two coupling pieces in mutual engagement, wherein one coupling piece has a plurality of rigid non-deformable aligning elements and a corresponding plurality of elastic pressing elements, and the other coupling piece has a plurality of rigid non-deformable cooperating elements such that when the coupling pieces are compressively interengaged, said rigid non-deformable aligning elements and cooperating elements, and said elastic pressing elements, cooperate to achieve accurate positioning of the coupling pieces in the circumferential direction by subjecting at least one of said plurality of aligning elements and said plurality of cooperating elements to relative circumferential forces in opposite circumferential directions such that the rigid, non-deformable cooperating elements and aligning elements are brought into forcible mutual abutment by said elastic pressing elements, and wherein each of said coupling pieces have cooperating reference surfaces extending transversely to the axial direction of compressive interengagement to allow accurate axial positioning.

29. A compressive holding device comprising two coupling pieces and means for reversibly, axially, and compressively engaging the two coupling pieces in mutual engagement, wherein one coupling piece has a plurality of rigid non-deformable aligning elements and the other coupling piece has a plurality of rigid non-deformable cooperating elements such that when the coupling pieces are compressively interengaged, said aligning elements and cooperating elements cooperate to achieve accurate positioning of the coupling pieces in the circumferential direction by subjecting at least one of said plurality of rigid non-deformable aligning elements and said plurality of rigid non-deformable cooperating elements to elastic forces in circumferential direction such that the cooperating elements and aligning elements are brought into forcible mutual abutment, and wherein each of said coupling pieces have cooperating reference surfaces extending transversely to the axial direction of compressive interengagement to allow accurate axial positioning.

* * * * *